United States Patent [19]
Nelson

[11] Patent Number: 5,692,970
[45] Date of Patent: Dec. 2, 1997

[54] COMPOSITE GOLF CLUB SHAFT

[75] Inventor: Ronald H. Nelson, Salt Lake County, Utah

[73] Assignee: Radius Engineering, Salt Lake City, Utah

[21] Appl. No.: 403,675

[22] Filed: Mar. 14, 1995

Related U.S. Application Data

[63] Continuation-in-part of Ser. No. 195,461, Feb. 9, 1994, Pat. No. 5,534,203.

[51] Int. Cl.⁶ .................................................. A63B 53/10
[52] U.S. Cl. .................................... 473/318; 473/319
[58] Field of Search ......................... 273/80 B, 77 A, 273/80 R, DIG. 7; 428/586; 473/318, 319

[56] References Cited

U.S. PATENT DOCUMENTS

| | | | |
|---|---|---|---|
| 2,153,550 | 1/1939 | Cowdery | 273/80 |
| 2,220,852 | 3/1940 | Scot | 273/215 |
| 2,250,429 | 6/1941 | Vickery | 273/222 |
| 2,457,117 | 12/1948 | Reach | 273/80 |
| 5,018,735 | 5/1991 | Meredith et al. | 273/80 R |
| 5,265,872 | 11/1993 | Tennent et al. | 273/80 |
| 5,316,229 | 5/1994 | Feche et al. | 273/80 |
| 5,316,299 | 5/1994 | Feche et al. | 273/80 R |

FOREIGN PATENT DOCUMENTS

| | | | |
|---|---|---|---|
| 90 15387 | 12/1990 | France | 273/80 |
| 90 15388 | 12/1990 | France | 273/80 |

*Primary Examiner*—Vincent Millin
*Assistant Examiner*—Charles W. Anderson
*Attorney, Agent, or Firm*—James L. Sonntag

[57] ABSTRACT

A substantially tubular rigid golf club shaft made of a composite of structural fiber laminate in a resin matrix, the shaft comprising a grip portion, a medial portion and a head attachment portion, the grip portion having a upper grip end and a lower grip end and being constructed and configured for a grip to be mounted on said grip portion that covers the exterior surface of the grip portion and extends substantially the entire length of said grip portion from said upper grip end to said lower grip end, the medial portion having a upper medial end adjacent to the lower grip end and extending a lower medial end adjacent to the head attachment portion, the head attachment portion having a upper head attachment end and a lower head attachment end with the upper head attachment end adjacent to the lower medial end, the head attachment portion constructed and configured for a golf club head to be mounted on said head attachment portion, a step transition in the exterior surface of the shaft that abruptly increases the diameter of the shaft between the exposed medial portion and either or both the grip portion and the head attachment portion.

12 Claims, 11 Drawing Sheets

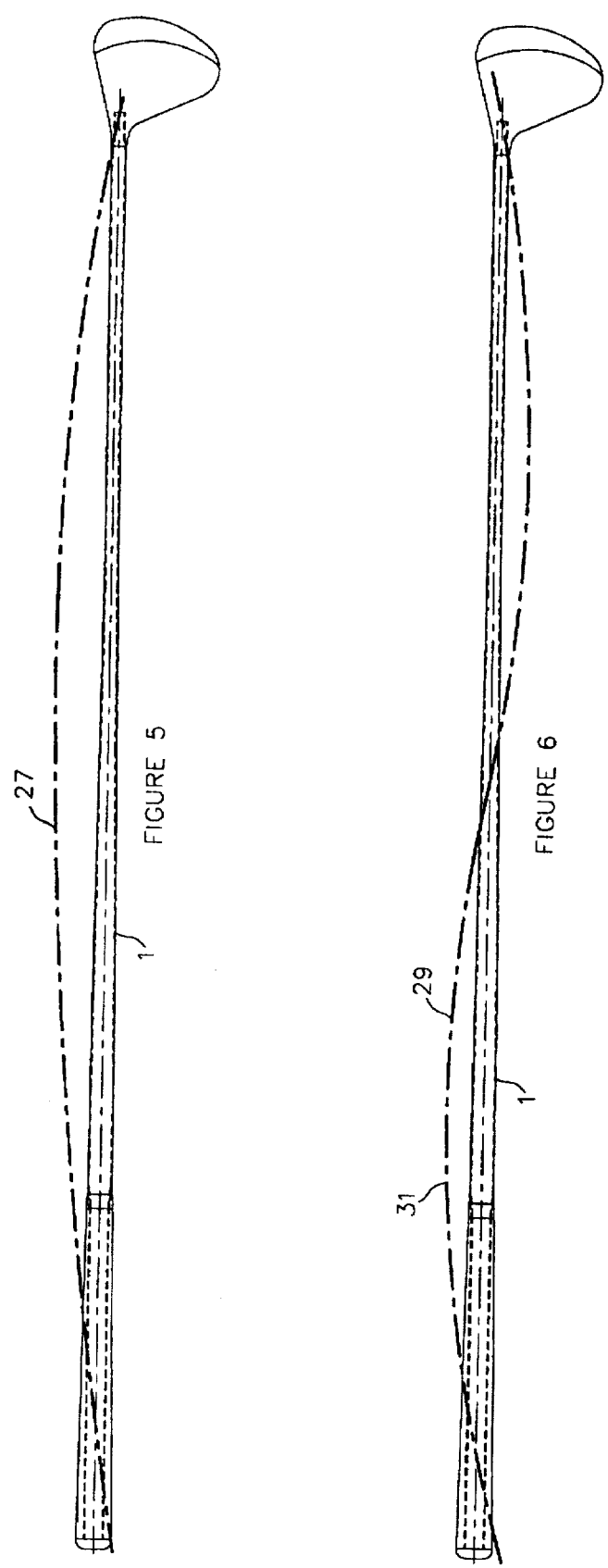

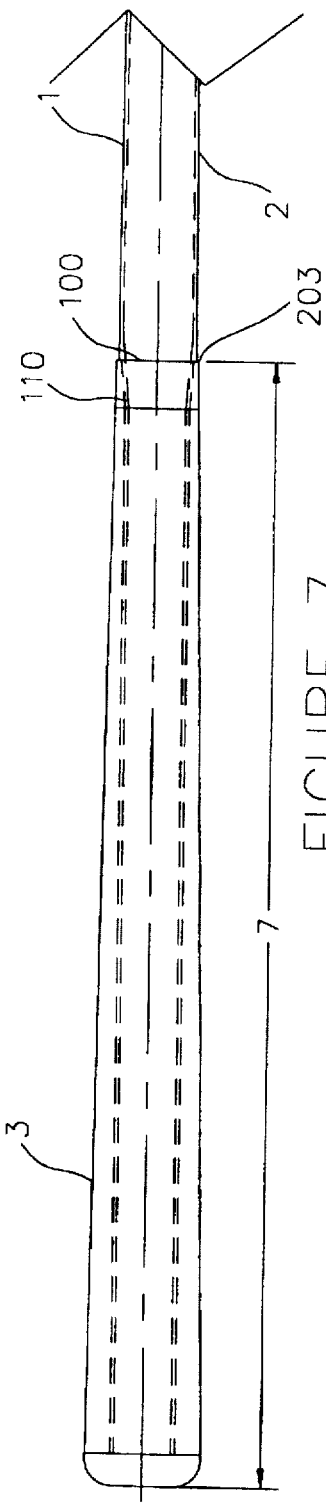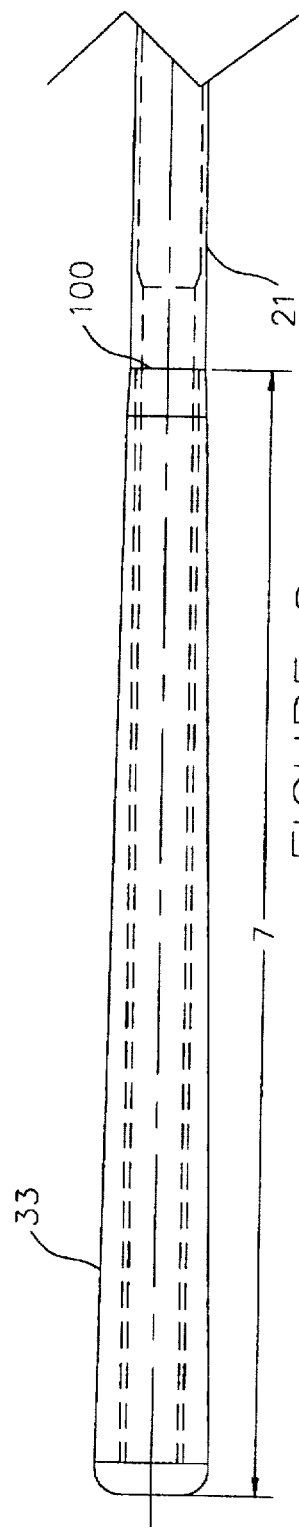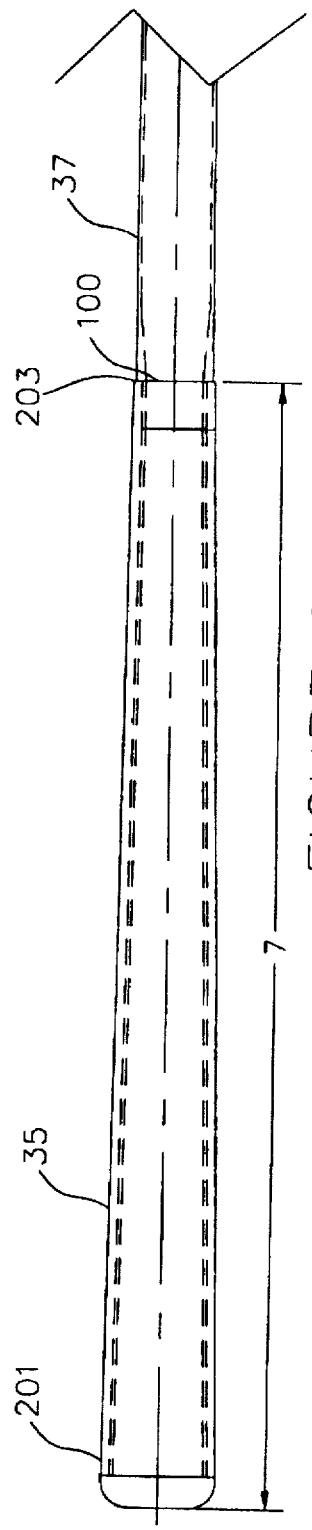

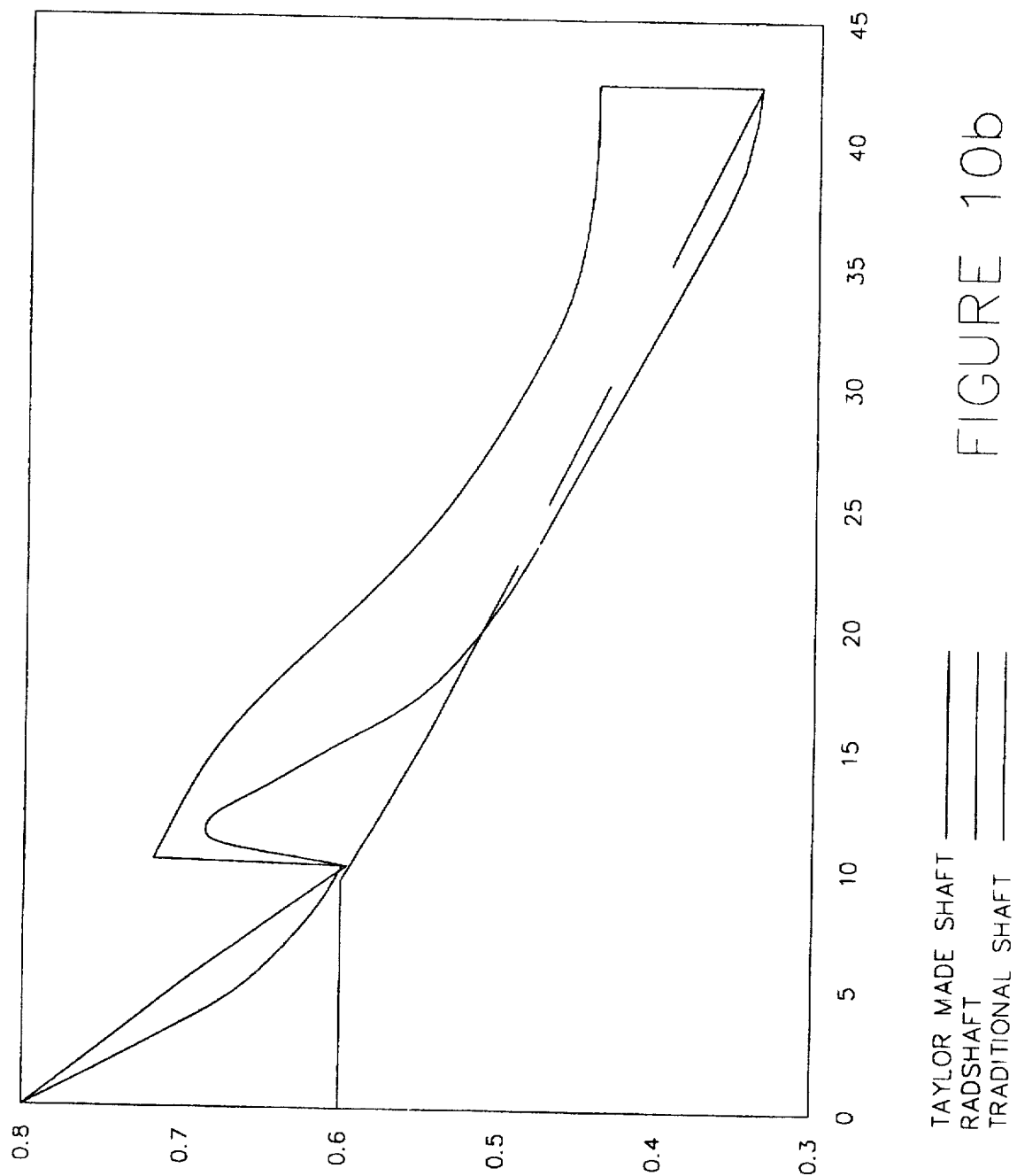

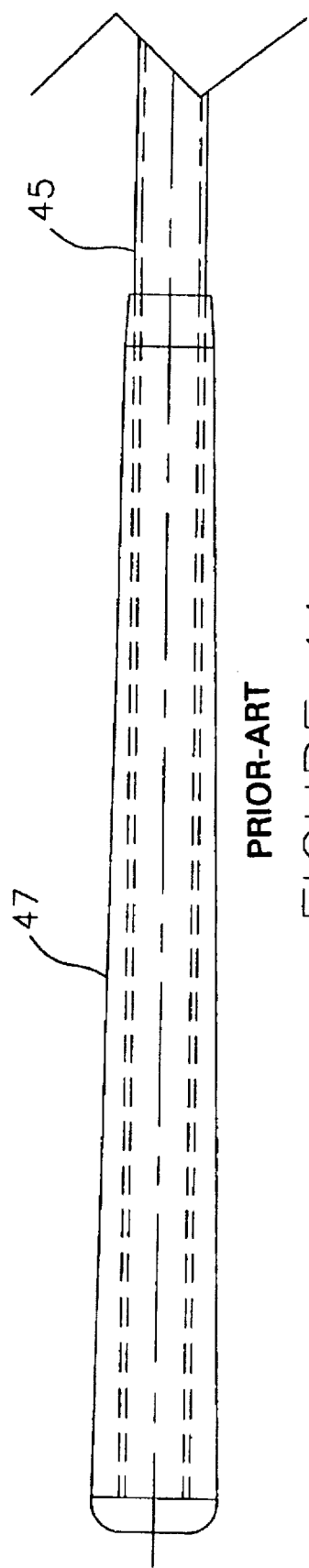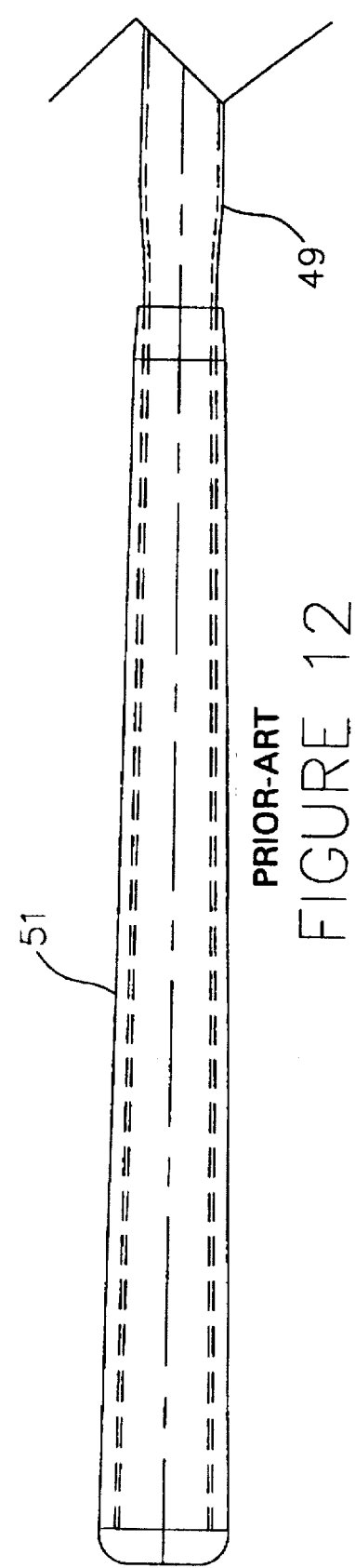
PRIOR-ART
FIGURE 11
PRIOR-ART
FIGURE 12

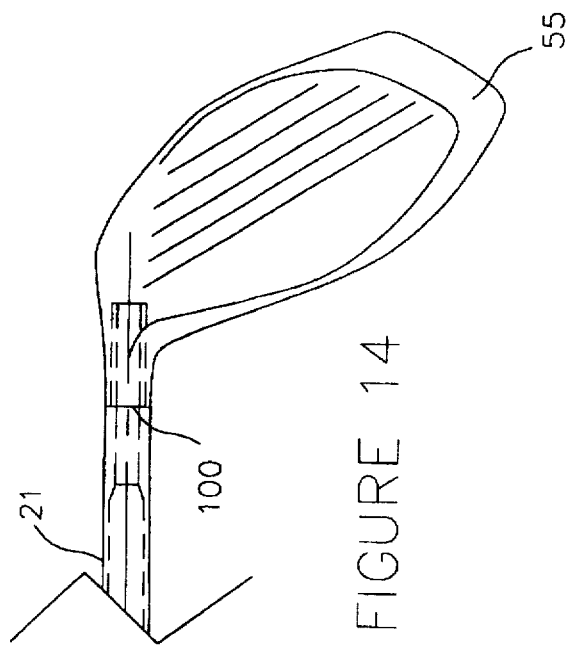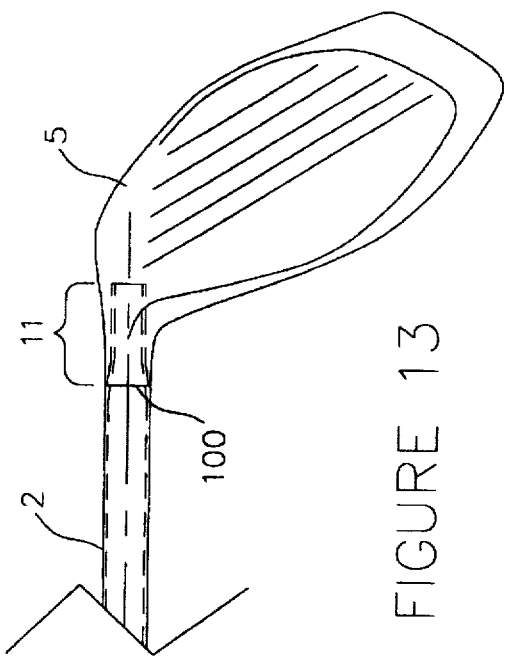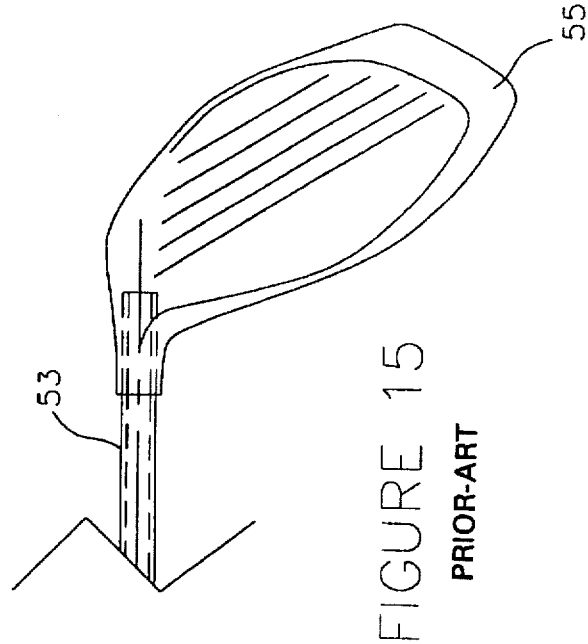
FIGURE 14
FIGURE 13
FIGURE 15
PRIOR-ART

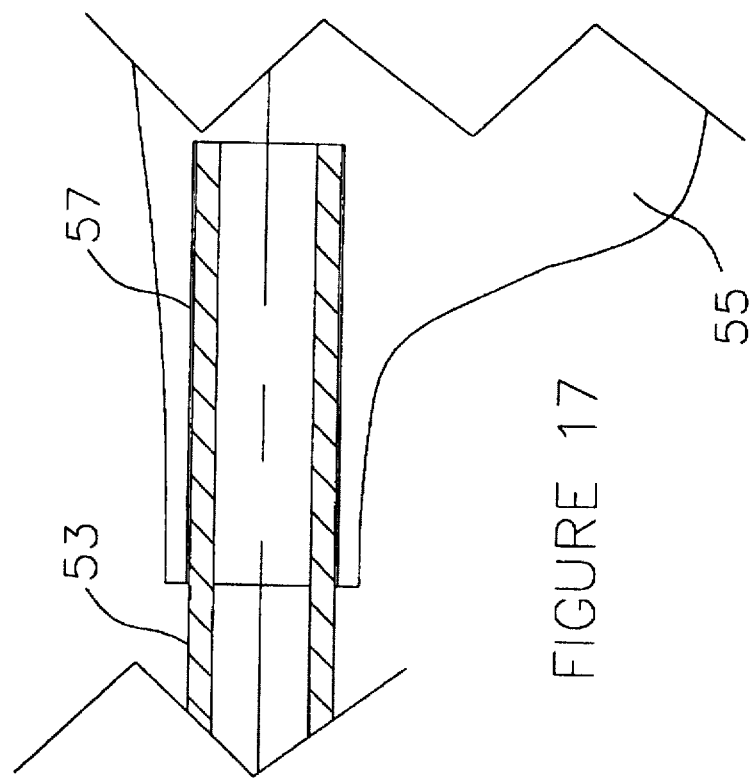
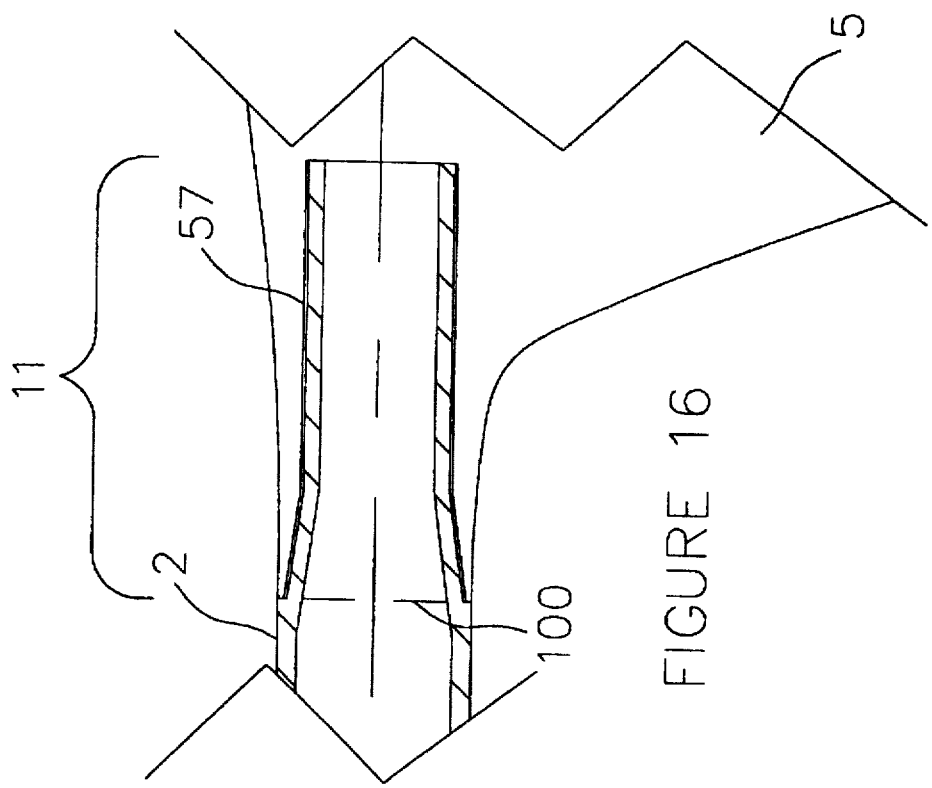

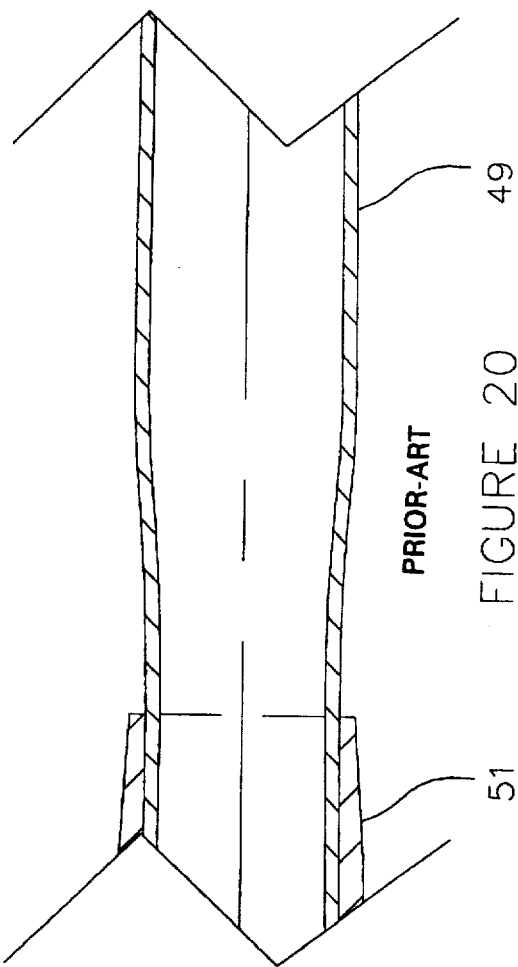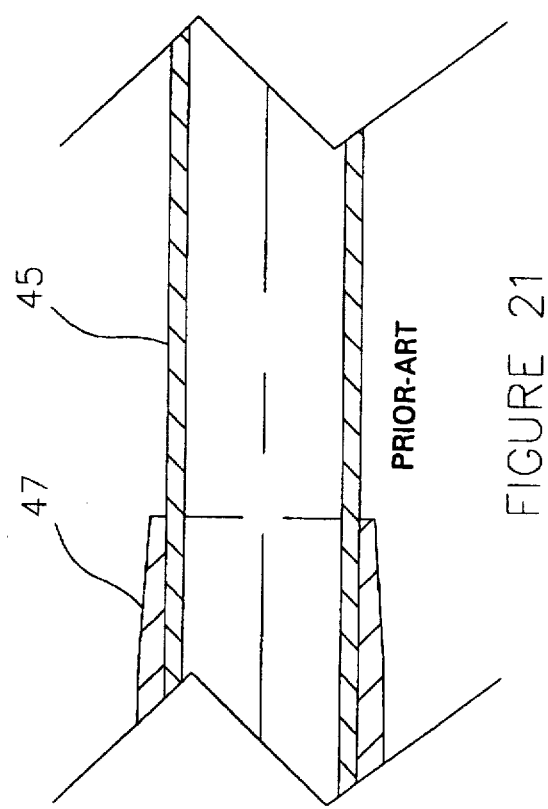

COMPOSITE GOLF CLUB SHAFT

RELATED APPLICATIONS

This application is a continuation-in-part of U.S. patent application No. 08/195,461, filed Feb. 9, 1994 now U.S. Pat. No. 5,534,203 issued Jul. 9, 1996. This application is directly related to the information contained in Disclosure Document No. 368065, as filed with the United States Patent and Trademark Office Document Disclosure Program, received Jan. 6, 1995.

FIELD OF THE INVENTION

This invention relates golf clubs having a shaft constructed of composite fiber/resin material, a grip, and a club head. In particular, the invention relates to clubs with optimized performance features.

BACKGROUND OF THE INVENTION

Below is a list of patents relating to golf clubs designed to increase performance:

5,316,299 "Golf Club Shaft", Feche, et. al.

5,265,872 "Golf Club Shaft Having Definable Feel", Tennent, et. al.

5,018,735 "Low Kick Point Golf Club Shaft", Meredith, et. al.

2,457,177 "Golf Club", Beach 2,250,429 "Golf Club", Vickery 2,220,852 "Golf Club Shaft", Scott, et. al.

2,153,550 "Golf Shaft", Cowdery

SUMMARY OF THE INVENTION

This invention pertains to a golf club comprised of: a golf club shaft constructed of composite fiber/resin material, a grip, and a club head. The shaft is designed to generally use shaft diameters slightly larger than normal, and contains specially designed geometry and shape features. These geometry and shape features are designed to advantageously control shaft deformation during the swing and ball impact (i.e. flexure and twisting), minimize shaft weight, and advantageously control mass distribution.

Specifically, an step diameter change feature geometry feature, in the form an abrupt annular step, is used in the shaft at the grip-to-shaft interface and/or at the shaft-to-clubhead interface. This step diameter change feature allows larger shaft diameters to be used while providing a smooth transition between the grip outer-surface and the shaft outer-surface, and between the club head hosel outer-surface and the shaft outer surface. Use of the step diameter change feature maximizes the amount of the shaft whose diameter can be made larger than normal shafts. The specific geometry of this feature also has certain benefits in terms of reducing the stresses in a shaft constructed of composite materials at the diameter change transition, and allowing a positive locating feature for positioning the grip and/or club head.

One aspect of this invention involves the use of a larger diameter shaft, in specific areas, to increase the structural efficiency of the shaft cross section, which reduces shaft weight. Advanced composites, have lower densities and higher strength and stiffness to weight ratios than traditional metals used in golf shafts (i.e. steel, aluminum and titanium). This allows a reduction in shaft weight without any geometry changes, and allows even more dramatic weight reductions if the geometries are changed to use generally larger diameters. In general, composite golf shafts have been made with the traditional diameters which were developed for and still used for steel shafts, and therefore the composite shafts have not been designed to take full advantage of the newer material's physical and mechanical properties.

One commercially available composite shaft, described in U.S. Pat. No. 5,316,299 to Feche, uses shaft diameters which are larger than normal in the upper end of the shaft below the grip. The areas where larger than normal diameters are used is limited to the upper half of the shaft, beginning a "short" distance, on the order of 1 to 2 inches below the bottom end of the grip. The specific structural efficiency advantages of the larger diameter are not addressed specifically in the patent. This shaft is commercially sold through Taylor Made, Inc., and the commercial literature for the product also does not specifically address the structural efficiency advantages of the larger diameters.

One aspect of this invention involves the use of the "step diameter change feature" to maximize the area of the shaft where the larger diameters can be used, by accomplishing at least some of the diameter change at one discrete axial location, located at the bottom end of the grip.

Composite materials also possess the added beneficial characteristic of having better structural damping, this reduces vibration and player fatigue. This invention utilizes composite materials, which have the highest stiffness and strength to weight ratios of any material generally available for shaft manufacture. It also uses innovative shaft geometries (i.e. diameter profiles down the length of the shaft) to minimize the shaft weight while producing the optimum shaft deformational characteristics (displacements of all types). The shafts of this invention would be constructed of an advanced composite material such as carbon or graphite fiber in a thermosetting plastic such as epoxy resin matrix material. Thermoplastic matrix materials, such as nylon, can also be used.

While any suitable method for making the composite shafts is contemplated, the shafts of this invention are most readily manufactured by the process described in U.S. patent application No. 08/195,461, filed Feb. 9, 1994, now U.S. Pat. No. 5,534,203 which is hereby incorporated by reference. This process is particularly adapted for producing the geometries of the shafts of the invention, and is different than what can be produced with the most common composite shaft manufacturing processes. This manufacturing process can generally be referred to a "molding process" or the shafts can be referred to as "molded shafts". This "molding process" closely define the outside shaft dimensions. In this method plastic laminates are laid up around an inflatable bladder and placed in a female mold. The bladder inflates to compact the laminates to substantially eliminate void and form a smooth, hollow shaft with a structurally strong and stiff skin. The outer dimensions of the shaft are accordingly defined by the dimensions f the female mold. By incorporating a step in the mold, the abrupt step in the shaft is formed in the shaft.

The molding process is distinctly different than the most common composite shaft manufacturing processes which rely on the use of a hard interior mandrel which closely defines the interior shaft dimensions during manufacture of the shafts. The golf shafts of the present invention cannot be manufactured by these interior mandrel methods, as these methods cannot be used to form the abrupt step transition. The molding process described above is also different than the process described in French patent applications numbered 90 15387 and 90 15388 that uses a hard interior mandrel, but also uses exterior molds.

Another means for manufacturing the shafts of the invention, although less preferred, and to provide for larger shaft diameters and flush exterior surface at the junctures, is to utilize boned joints between separate composite tubular components to form a bonded shaft. The three components would be manufactured via traditional means using rigid internal mandrels, and then secondarily bonded together. This could also be accomplished as a co-cured operation. In this embodiment the structural laminate fibers of the large diameter medial portion are discontinuous, end at the abrupt step transition. Fibers from the grip portion and/or head attachment portion (first portion) underlie the structural laminate of the medial portion (second portion) and are continuous at the step transition.

In summary, the clubs of the invention are advantageous because of the use of larger diameters over as much of the shaft as possible to increase structural efficiency and reduce shaft weight. Specifically increasing the diameter and correspondingly the stiffness of the area directly below and adjacent to the lower end of the grip helps reduce the detrimental higher frequency vibratory modes. Larger diameters are used in areas where the diameter is not constrained by the interface requirements to other club components, such as directly below and adjacent the grip end a directly above and adjacent the hosel of the club head. This is accomplished while accommodating the constraints of shaft outer diameters under the grip and/or inside the hosel of the club head. Shaft outer diameters may also be reduced in the "flex point" area of the shaft, when required to produce correct bending characteristics.

The shaft of the present invention produces smoother exterior surface contours at the junctures of grip-end and shaft, and/or with hosel-end and shaft by using abrupt exterior shaft diameter changes at the lower end of the grip and/or upper end of hosel. This produces a more cosmetically pleasing appearance, and increases diameter as quickly as possible to maximize length of shaft which can be made larger diameter. It is especially important to increase the diameter and stiffness of the in the area directly below and adjacent to the lower end of the grip to enhance the desirable stiffness characteristics of the shaft, why no done before.

The use of novel means to rapidly accomplish abrupt diameter change while maintaining structural integrity, and minimizing weight is a substantial advantage. Abrupt contour changes in composites or any material, including the abrupt diameter changes of this invention, form inherently weak points in a structure and are generally avoided, therefore novel means of accomplishing diameter changes are needed.

In the preferred molded shafts, wherein a continuous laminate is at the diameter change feature without the addition of local reinforcing material, minimizes weight. All the structural material (i.e. structural laminate) in the shaft is continuous through the diameter change. The structural laminate is continuous at the step transition or diameter change feature and the angle of the laminate in relation to the longitudinal axis of the shaft is less than 35 degrees. The same advantages are obtained with all of the laminate being continuous through the diameter change except for one exterior ply of cloth or woven material which would terminate at the step. The cloth ply material is there for cosmetic purposes and to provide a more damage resistant surface on exposed surfaces. Cloth or woven material is not used on shafts which are subsequently painted, and generally its use is minimized because it is significantly more expensive than other material forms.

In alternate shafts of the invention wherein the laminate in the mediate portion is discontinuous, ending at the step transition. The preferred variant consists of having all of the composite laminate in the medial portion being discontinuous at the diameter change (this would be distinctly different than in the Tennent patent which uses a gradually discontinuous laminate). This shaft would preferably be constructed in one molding operation in the preferred embodiment, as opposed to secondarily bonding of separate pieces which have been previously formed.

In a preferred embodiment of the invention, larger diameters are at the ends of the medial portion with a narrow waisted region to localize flex point. Selecting diameter profiles down length of shaft to localize flex point and promote better control by reducing the effects of detrimental natural vibratory modes, which are modes above the first fundamental vibratory mode.

Another preferred feature is to provide a tapered grip portion for the shaft. The shaft under grip is tapered in a fashion to mimic the grip outer surface taper, to allow the use of a more or less constant thickness grip, with a thickness approximately equal the thinnest portion of traditional grips. This reduces the weight of the grip and allows the shock absorbing qualities of the grip, which are dependent on the grip thickness, to remain constant over the length of the grip, promoting enhanced "feel" and control of the shaft. The shaft under the grip is a larger diameter and also utilizes thinner walls producing a lighter shaft in this area also. Reducing weight and/or increasing stiffness at the top end of the shaft under the grip is not particularly important. Reducing the weight in this location actually requires a corresponding decrease in club head weight, to maintain the same swing weight. The swing weight is roughly analogous to the balance point of the club. Increasing stiffness is not necessary because the loads are relatively low or nonexistent.

The preferred molded shafts for form by a high pressure molding process which allows the complex geometry features of the shafts of this invention to be easily produced and also produces tight dimensional tolerances on outside shaft dimensions without secondary grinding or machining of outer surface. Traditional manufacturing process using hard interior tooling cannot form the relatively complex geometry features, and also requires secondary grinding of the exterior surfaces, which is not conducive to use of woven composite exterior layers used for cosmetic purposes on unpainted surfaces.

BRIEF DESCRIPTION OF THE DRAWINGS

FIG. 5 is a cutaway view of a shaft of the invention, combined with a deflected centerline shape of the club. This deflected centerline shape illustrates the first vibratory mode of the club which occurs during the swing, and advantageously increases club head speed during ball impact.

FIG. 6 is a cutaway view as in FIG. 4 with a deflected centerline shape of the club that illustrates the second vibratory mode of the club which occurs during the swing and ball impact. This vibratory mode detrimentally effects the player's control during ball impact.

FIG. 7 illustrates the grip portion of a preferred shaft of the invention with an attached grip.

FIG. 8 illustrates the grip portion of the golf club of one embodiment of this invention. This embodiment of the invention utilizes a discontinuous laminate in the medial section at the abrupt diameter change caused by the step.

FIG. 9 illustrates the grip portion of a golf club of one embodiment of this invention. This golf club shaft utilizes a tapered shaft underneath the grip to reduce the weight of the grip, and the shaft in this area.

FIGS. 10a and 10b are graphs of shaft length vs. diameter for clubs of the invention and clubs of the prior-art.

FIG. 11 illustrates the grip end portion of a traditional golf club shaft.

FIG. 12 illustrates the grip end portion of a commercially available golf club shaft which uses a tapered shaft underneath the grip portion of the shaft, and also utilizes a gradual taper to a larger shaft diameter below the lower end of the grip.

FIG. 13 illustrates the head attachment or tip end portion of a preferred shaft of this invention with a head attached. The preferred embodiment shown in FIG. 13 has a continuous laminate at and throughout the abrupt diameter change in the tip portion of the shaft.

FIG. 14 represents the tip portion of a golf club of one embodiment of this invention. The tip portion of the shaft of this embodiment of the invention uses discontinuous fibers from the medial section at the diameter change at the abrupt step transition, with continuous fibers from the tip portion continuous at the step transition and underlying the discontinuous fibers from the medial section.

FIG. 15 illustrates the tip portion for a traditional composite shafted golf club.

FIG. 16 illustrates an expanded view of the joint between the golf club head and the shaft tip for a preferred embodiment of this invention.

FIG. 17 illustrates an expanded view of the joint between the golf club tip and the golf club head for a traditional composite shafted golf club.

FIG. 20 illustrates commercially available golf club shaft showing an expanded crossection of the lower end of the grip with a tapered shaft underneath the grip and a portion of the shaft in the same area which shows a gradual taper to a larger shaft diameter.

FIG. 21 illustrates a crossection of the lower end of the grip of a traditional composite shafted golf club.

DRAWING PARTS LIST

Figure 1:
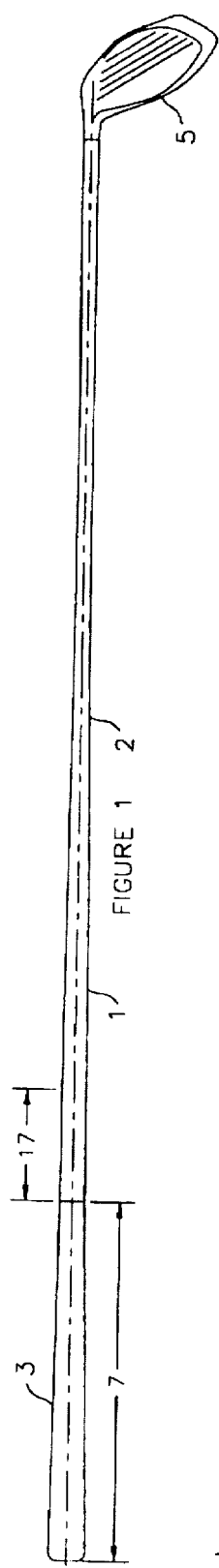
FIG. 1 is an exterior view of the complete golf club using a preferred shaft of the invention.
Figure 2:
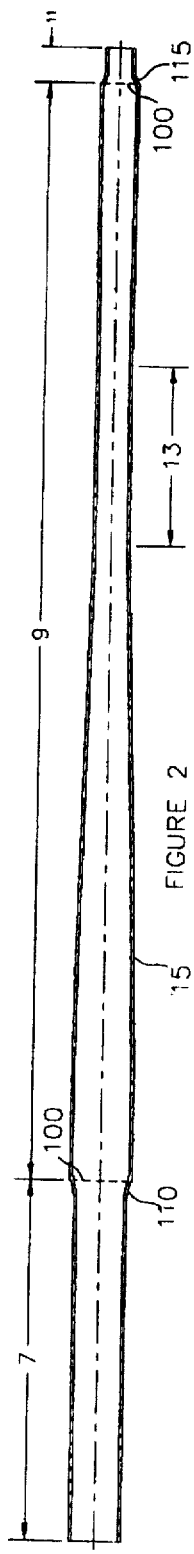
FIG. 2 is a cutaway view of a preferred embodiment of the shaft which has been expanded in the diametral direction to better illustrate the shape features. This shaft uses a continuous laminate (hardened plastic resin material reinforced with continuous fibers in the planar directions, i.e. generally parallel to the axis the shaft) at the abrupt diameter changes caused by the step. This shaft also uses a reduced diameter section, "narrow waist", in the lower middle portion of the shaft to better localize the point of bending for the advantageous flexural modes.

Below is a brief description of the labeled parts in Figures;

Part number 1 is the preferred embodiment of the golf club of this invention.

Part number 2 is the preferred embodiment of the golf shaft of this invention.

Part number 3 is the grip used on the preferred embodiment of this invention.

Part number 5 is the head used on the preferred embodiment of this invention.

Part number 7 is the grip attachment portion of the shaft.

Part number 9 is the visually exposed medial portion of the shaft.

Part number 11 is the club head attachment portion of the shaft. This portion of the shaft is inserted into the club head, or into the hosel portion of the club head.

Part number 13 is a reduced diameter section of the visually exposed medial portion of the shaft 9, otherwise referred to as the narrow waist region of the shaft.

Part number 15 is the preferred embodiment of the golf shaft, of this invention which has been expanded in the diametral direction to better illustrate the shape features.

Part number 17 is a portion of the shaft body adjacent to and directly below the lower end of the grip. The stiffness of this portion of the shaft is critical in reducing the effects of the detrimental higher frequency vibratory modes.

Part number 19 is a golf shaft embodiment of this invention that uses a continuous laminate through the abrupt diameter changes, and which has been expanded in the diametral direction to better illustrate the shape features. This shaft diameter profile does not utilize a "narrow waist" or reduced diameter section.

Part number 21 is golf shaft embodiment of this invention that uses a discontinuous laminate through the abrupt diameter changes, and which has been expanded in the diametral direction to better illustrate the shape features. This shaft diameter profile does not utilize a "narrow waist" or reduced diameter section.

Part number 27 is the deflected centerline shape of the golf club in its first vibratory mode, which occurs during the swing, and advantageously increases club head speed during impact.

Part number 29 is the deflected centerline shape of the golf club in its second vibratory mode, which occurs during the swing and ball impact. This vibratory mode detrimentally effects the player's control during ball impact.

Part number 31 is the portion of the centerline deflected shape for the second vibratory mode 29, which corresponds to the area of highest bending stress in the shaft, which also corresponds to where the largest shaft diameters are used in the present invention.

Part number 33 is the grip for the shaft embodiment of this invention which uses a discontinuous laminant through the abrupt diameter changes 21, and this shaft diameter profile does not utilize a narrow waist or reduced diameter section in its medial portion.

Part number 35 is the grip for the one embodiment of a shaft of this invention 37.

Part number 37 is a golf club shaft embodiment of this invention, which uses a tapered shaft underneath the grip to reduce the weight of the grip and shaft in this area. This shaft also utilizes a continuous laminant through the diameter change.

Part number 45 is a traditional composite golf club shaft.

Part number 47 is a grip used on a traditional golf club shaft.

Part number 49 is a commercially available golf club shaft which utilizes a tapered shaft underneath the grip and also utilizes an oversized shaft diameter below the grip. The transition from the standard diameter shaft at the very lower end of the grip to the larger diameter shaft further down the shaft occurs slowly over approximately two shaft diameters.

Part number 51 is a grip used on existing commercial composite golf club shaft 49 which utilizes a tapered shaft underneath the grip.

Part number 53 is the tip end of a traditional golf club shaft.

Part number 55 is the golf club head for a traditional golf club, and can also be used in an unmodified state on one shaft embodiment of this invention.

Part number 57 is the adhesive bondline between the golf club shaft tip and the golf club head.

Part number 59 is the grip end of a shaft embodiment of this invention which utilizes a continuous laminant through the diameter change. The discontinuous step size in the diameter change for the shaft is slightly larger than in the preferred embodiment of this invention.

Part number 61 illustrates the angle difference between the continuous laminant portion of the shaft through the diameter change, and the centerline of the shaft.

Part number 63 illustrates a grip on a shaft of the invention.

Part number 100 illustrates the precise location of the abrupt diameter change in the various embodiments of the present invention.

Part number 110 illustrates the tapered conical portion of the abrupt diameter change feature in the grip area, of the various embodiments of this invention. The laminant is continuous through this tapered portion of the abrupt diameter change.

Part number 115 illustrates the tapered conical portion of the abrupt diameter change feature in the head attachment area, in the various embodiments of this invention. The laminant is continuous through this abrupt diameter change portion of the shaft.

Part number 120 illustrates the abrupt diameter change in one embodiment of this invention, in the grip portion of the shaft. The laminant is discontinuous through this portion of the shaft in this embodiment of this invention.

Part number 125 illustrates the abrupt diameter change in the tip portion of the shaft, in this embodiment of the invention. The laminant is discontinuous through this portion of the shaft in this embodiment of the invention.

Part number 201 illustrates the upper grip end of various embodiments of the invention.

Part number 203 illustrates the lower grip end of various embodiments of the invention.

Part number 207 illustrates the upper medial end of various embodiments of the invention.

Part number 209 illustrates the lower medial end of various embodiments of the invention.

Part number 211 illustrates the upper head attachment end of various embodiments of the invention.

Part number 215 illustrates the lower head attachment end of various embodiments of the invention.

Part number 217 illustrates structural laminate layers in the shaft of the invention wherein the structural laminate layers are continuous at the step diameter change.

Part number 219 illustrates non-structural laminate layers or filler materials in the shaft of the invention wherein the structural laminate layers are continuous at the step diameter change.

Part number 221 illustrate structural laminate layers of the medial section that end at the step diameter change.

Part number 223 illustrates structural laminate of the grip portion that underlies the structural laminate layers of the medial section.

Part number 224 illustrates the grip portion of the shale of the invention wherein the structural laminate layers of the medial section end at the step diameter transition.

Part number 225 illustrates the medial portion of the shale of the invention wherein the structural laminate layers of the medial section end at the step diameter transition.

DETAILED DESCRIPTION OF THE INVENTION

Background—Overall Club Design Parameters

Club design can be optimized by controlling the flexure (i.e. relative displacement in the club) characteristics of the club, and controlling the mass distribution in the club. The benefits of the present invention are described in terms of these two characteristics.

Specific Performance Advantages of Clubs Utilizing This Invention

Clubs made with shafts of this invention will contain specific performance advantages obtained through a.) better control of the shaft deformation during swing and ball impact, and b.) better distribution of mass in the club. Optimum shaft flexure characteristics can be improved by designing shaft geometries to produce natural modes of vibration which promote better control of the club head during swing and impact, and also maximize club head speed at impact. The first step in improving mass distribution is to minimize the weight of the shaft needed to obtain the aforementioned flexural characteristics, and of course to meet the strength requirements. Minimizing the amount of structural weight then allows weigh to be added to the club head or the shaft to obtain improved mass properties in the club. Both of performance advantages can be obtained by using generally larger shaft diameters over as large a portion of the shaft as is possible. Of course, the geometry limitations created by the need to correctly interface with the grip and/or the club head must be accounted for.

Background—Role of Club Natural Vibratory Modes in Club Performance

There is one critical fundamental vibratory mode which is used advantageously by the player during his swing. This vibratory mode is activated at the start of the swing, when the shaft and club head bends or flexes backwards relative to the players hands, as the club is accelerated towards the ball. The shaft and club head, which initially bend backwards at the start of the swing, then bends forward (relative to the player's hands) later in the swing. In essence, the shaft and club head are oscillating or vibrating, about a reference plane moving with the player's hands. Ideally, the shaft will be flexing forward relative to the player's hands as the club head strikes the ball, increasing the club head speed. This flexure is referred to as the first fundamental vibratory mode, in the description of this invention, and is shown in FIG. 5. This mode shape is characterized by a relatively smooth continuous bending of the shaft, with the direction of bending being the same over the length of the shaft. A standardized test has been developed by the golf industry to quantify the frequency of this vibratory mode. This test involves clamping the club rigidly in the grip area, and letting the club head vibrate freely, after applying and then releasing an initial load. If the club is tailored correctly to the player, the player can use this vibratory mode in junction with his swing, to increase the club head speed considerably relative to what he could obtain is the club shaft was rigid. Therefore, the first fundamental vibratory mode for a club needs to be designed or selected to match the players swing. Therefore, the shaft flexural characteristics which control the overall bending deflection of the shaft tip are an important design parameter. The first fundamental vibratory mode is controlled by the mass distribution in the club, primarily club head weight, and the shaft bending stiffness, i.e. primarily the deflection of the tip of the shaft for a given load at the tip.

The deflection of the shaft during the swing due to vibration in the first fundamental vibratory mode, also causes the club head face to rotate relative to its position when the club head is at rest. This can change the effective loft of the club head, producing a "dynamic loft" which is different than the static loft when the club head is at rest. The amount of loft change which occurs when the club is swung, is has traditionally been characterized by identifying the "flex point" of the shaft. A shaft with low flex point is characterized by having higher club head rotation during the swing, i.e. more loft change. The rotation of the club head or loft change during the swing has been found to have a substantial effect on the club's performance. Therefore, the shaft flexural characteristics which control the rotation of the shaft tip as the shaft flexes are also an important design parameter.

There are also additional higher frequency; natural vibratory modes of the shaft. In particular the second vibratory mode produces a shaft deflected shape having an "S" shape and is shown in FIG. 6. The direction of the bending is not smooth and continuous in one direction, but rather the direction of bending reverses near the middle of the shaft. In general, these higher frequency vibratory modes do not contribute to increased club head speed, and they also tend to reduce control over the club head during impact, therefore introducing a variability into the trajectory of the ball after impact. Therefore, it is desirable to reduce the effect of higher vibratory deflection modes.

Design of Shaft for Optimum Flexural Characteristics

The undesirable characteristics of these higher frequency natural vibratory modes can be reduced by designing shaft flexural characteristics which increase the frequencies of these modes and therefore decrease the deflections associated with each higher mode. Of course any changes to shaft flexural characteristics which are designed to minimize the detrimental effects of the higher frequency modes, should not interfere with control of the first fundamental vibratory mode which is beneficial. This can be achieved by localizing the area of bending for the first mode. Localizing the area of bending better isolates the first mode from the higher modes thus reducing shaft response (displacements) to the higher modes, thereby increasing control and reducing variability of the impact. The deflections can be localized by changing the profile of shaft stiffness (dependent on diameter, wall thickness and material modulus), along the length of the shaft.

Localizing the deflections can be achieved by utilizing larger diameters in selected areas of the shaft. Therefore, utilizing larger diameters in the shaft has two advantages. One advantage is to minimize vibrations and displacements associated with higher frequency modes of vibration above the first flexural mode by localizing the beneficial club displacements during swing and impact. This isolates the beneficial displacements and allows the detrimental displacements to be minimized. The second advantage is that shaft weight is minimized by increasing structural efficiency. Of course, the maximum gains in structural efficiency are obtained if the shaft diameters are increased over as much of the shaft length as possible. The step diameter change feature of the invention maximizes the area of the shaft where the larger diameters can be used.

The geometry and shape of the "step diameter-change feature" allows the diameter to be changed over as short a distance as possible and is designed specifically for laminated composites.

The present invention maximizes the portions of the shafts where larger shaft diameters can be used by use of a step diameter change feature. This feature allows the shaft diameter to be increased as rapidly as possible where needed. The taper feature reduces shear stresses in the composite which reduces local displacement and increases strength. The step feature positively locates junctures and allows a flush or nearly flush exterior surface to be produced at the transition from the grip end to the shaft and/or from the club hosel end to the shaft. This minimizes aerodynamic drag and improves cosmetic appearance. Cosmetic appearance while obviously important for general consumer acceptance is also important because physiological factors such as a player's confidence in his equipment is so important in playing good golf. As mentioned, the shafts of this invention are most readily manufactured by the process described in U.S. patent application No. 08/195,461, filed Feb. 9, 1994.

Background—Shaft Design Constraints

The exterior shape of golf shafts is influenced strongly by the need to interface the shaft with the grip which is slid over the shaft at the upper end of the shaft, and the club head, into which the shaft is typically inserted. The exterior shape is also of course greatly effected by the manufacturing process used to the make the shafts, and any inherent geometrical limitations of the process. As mentioned previous composite manufacturing processes have several inherent limitations on shafts geometries which can be produced.

Grip Area Interface

The size and shape of the grip outer surface is defined by the optimum shape required for the player's hands. The grip area of a club is shown as Part 7 in FIG. 1. In general a tapered grip area which is about 10" long and has an outside diameter ranging from 0.78" at the lower end to 1.07" at the upper end is most common and optimum for the average sized player. Typically, shafts have been constructed with a constant diameter underlying the grip area and the taper is produced by a rubber grip whose thickness varies from 0.086" at the lower end to 0.236" at the upper end.

One innovation implemented in this invention, in its preferred embodiment, is to use a tapered shaft underneath the grip, with the majority of the shaft under the grip being larger than the standard 0.600" diameter. This design feature is shown in FIG. 9. This allows a nearly constant wall thickness grip to be used, therefore reducing the grip weight. Grip weights can be reduced by roughly 10 gr. by this means, and shaft weight can also be reduced.

Club Head Interface

The majority of "wood"-type club heads use a 0.335" diameter parallel tipped shaft to join into the inside of the hosel of the club head. Some "wood"-type club heads essentially eliminate the hosel, but still use an approximately 1" long joint with a 0.335" outside diameter parallel tipped shaft. These club heads are referred to as "hosel-less". "Wood" type clubs have been shown for purposes of illustration of this invention, however it is expected that the invention would also be applied to "iron" type clubs, and also putters. Putter shafts can also use bends in the shafts, and the design features of this invention are applicable to these bent shafts.

The outside diameter of the hosel on a "wood" type club head is usually approximately 0.445". A small plastic ferrule, about 0.5" long, is usually slide over the shaft prior to adhesively bonding the shaft into the club head. This ferrule is placed at the junction of the shaft and hosel of the club head to somewhat visually smooth the outside diameter transition. This ferrule has been omitted from the Figures because its purpose is purely cosmetic.

Step Diameter Change Feature

The step diameter-change feature is used on each end of the shaft to connect the shaft to different parts of the club. Although the loads are transferred into the shaft a little differently on each end, the step diameter-change feature function's on both ends of the shaft, have the common characteristic having to be capable to transmit high bending, shear, and torsional loads through them. On the tip, the hosel is adhesively bonded to the shaft at the step diameter-change feature which then becomes part of the joint between the hosel and the shaft. The loads in this case, are transferred from the hosel inner surface, which is generally cylindrical in nature, to the shaft, primarily through shear stresses in the adhesive bonding layer. High loads are carried through the step diameter-change in the laminate in this case, with some of the load to the shaft occurring in the tapered conical portion of step-taper diameter-change feature. In the case of the grip end, the loads are transferred from the player's hands into the middle to lower half of the grip area. These loads are transferred through forces normal to the grip surface, and through shear loads between the player's hands and the grip surface. In this case, the loads are completely transferred to the shaft a distance above the tapered conical portion of step-taper diameter-change feature.

The step diameter-change feature on both ends of the shaft needs to be designed so as to carry these high loads without any or with very little additional reinforcement, in order to reduce the shaft weight. Also, in the case of the shaft tip-end step-taper diameter-change feature, the diameter of the shaft is so small, that adding additional reinforcing material on the inside of the laminate, has only a small effect on bending and/or torsional strength because the additional material is so close to the shaft centerline.

A step diameter-change feature design has been developed which is capable of transmitting the high internal structural loads from the grip area to the shaft body, and from the hosel of the club head to the shaft body. The step diameter-change feature is easily formed during the molding of the shaft component. It also allows a smooth continuous exterior connection or nearly smooth connection between the shaft body and the grip and/or the hosel of the club head to the shaft body. This is accomplished without any or very little additional reinforcing material being added to the shaft component.

Hosel to Shaft Joint

In the present invention a small discrete and abrupt vertical step is used as a transition to a smaller diameter section. The small discrete vertical step serves several useful purposes. The vertical step provides a positive stop for location of the hosel end with respect to the shaft. In addition, in addition to the step, the diameter is further reduces by means of a conical section that forms diameter reducing taper at the base of the step. The positive positioning provided by the stop action of the step positioning controls the adhesive thickness in the tapered conical section of the step-taper diameter-change feature. Adhesive is needed in the conical tapered area of the step-taper diameter-change feature to reduce the peak stresses in the step-taper diameter-change feature by allowing load transfer to occur in this area of the step-taper diameter-change feature. The positive positioning provided by the small step also help ensure the shaft smaller diameter centerline is parallel to the hosel tube centerline. The small discrete step transition also simplifies hosel fabrication and finishing prior to bonding together of the frame since there is a corresponding step on the mating hosel tube and it is much simpler to trim the hosel tube ends to blunt end rather than a sharp edge. The small discrete step also minimizes any small gaps or cervices between the hosel tube end and the shaft section, providing a continuous sealed outer surface.

The small discrete vertical step at the very base of the smaller diameter section is preferably followed by short tapered conical section, which blends into a cylindrical portion at the end of the smaller diameter. The tapered conical section performs two important structural functions. It reduces peak stresses in the step-taper diameter-change feature adhesive because the resulting tapered end on the mating hosel allows a more gradual load transfer. Tapering the wall thickness of the hosel to a thin edge at its end, make the hosel wall more complaint where the load transfer starts between two components. This reduces the stress concentration in the adhesive at the hosel tube end. The tapered conical section, provides a means to keep low the angle in the longitudinal fiber layers at the step transition, which make a sharp angle with the hosel tube-smaller diameter centerline. This is essential to reduce the radial axial shear stresses to an acceptable level in order to prevent localized failure at the diameter change.

Figure 22:
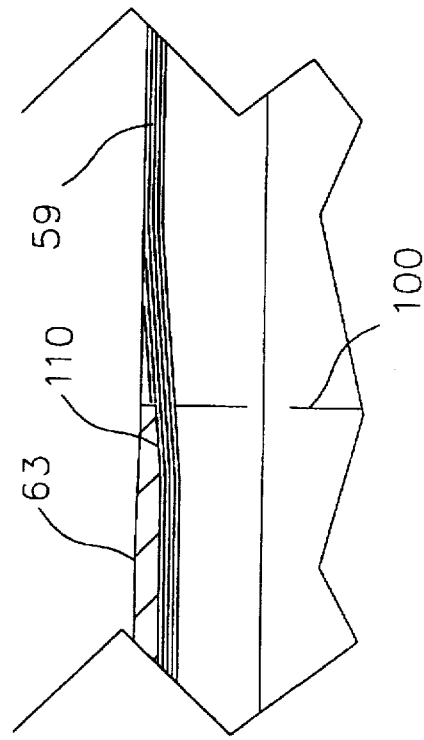
FIG. 22 illustrates a greatly expanded crossectional view of the junction between the lower end of the grip and the golf club shaft at the abrupt step transition, for a preferred embodiment of this invention.

In general, the angle of this tapered section with the shaft or hosel-tube centerline must be less than 35° to produce reasonably lightweight shafts. This angle is shown in FIG. 22 as 130. Using lower angles, down to about 5° results lower stresses, but an angle too low increases the difficulty to form the step transition in a manner that is satisfactory. An angle of approximately 10° is used in the preferred embodiment of this invention. This angle allows the shaft to be formed without any additional reinforcement added in the smaller diameter area of the shaft or the end of the hosel tube.

In the preferred embodiment of this invention there are also several small longitudinal splines on the cylindrical portion of the smaller diameter. These splines are nominally approximately as high as the adhesive thickness or gap between the hosel tube and the shaft smaller diameter section. These splines are not essential, but do serve to center the tube on the shaft smaller diameter, providing a uniform adhesive thickness and ensuring a smooth exterior surface without steps is formed at the tube-shaft interface.

In general, only the dimensions on one surface of a composite part can be accurately controlled during manufacture, when complex geometries are present, such as in a shaft of this invention. Tight dimensional control of the adhesive thickness is required to reliably produce high strength bonds between the shaft and the club head. In the preferred embodiment of this invention, the required dimensional tolerances on the adhesive thickness are set to control it within 0.004" and 0.012". This requires very tight dimensional control of the hosel and shaft components which will be mating with each other. By manufacturing the shaft component in matched female tooling, the outer dimensions can be controlled to very tight tolerances. The use of shaft components formed in female tooling designed to fit inside the hosel allows a high strength joint to be obtained.

The surfaces which will be bonded with the adhesive are cleaned with a solvent to remove any mold release agents or other contaminants. Generally a two part epoxy adhesive would be used. The two fluid components of the adhesive are mixed together and applied to surfaces being bonded. The shaft is then slid into the hosel. As described above, the splines and vertical step in the step-taper diameter-change feature ensure that the components are correctly aligned. The nominal design bondline thickness is 0.010". A nominal design spline height of 0.005" is used.

Higher shear strength and compression strength in the laminate are produced with higher laminate compaction pressures when a molded manufacturing process.

The invention pertains to composite shafts which when joined to appropriate grips and club head hosels, produce an essentially smooth continuous outer surface or at least visually imperceptible step, at the junctures between the components.

The primary determinate of the local stresses in the shaft at the joints, is the angle that the fiber makes with the shaft centerline.

Utilizing a discontinuous discrete vertical step at the juncture of the lower end of the grip and the shaft is preferable to the option of using a tapered shaft without a discrete vertical step. this is because in the later case, the grip thickness would have to be tapered precisely to match the corresponding taper in the shaft, and the grip thickness would become very thin at its lower edge and hence would be considerably more susceptible to wear and abrasion.

In practice, the relative size of the step to the taper, in the step-taper diameter change feature, can be varied considerably. It can range from a small vertical step, with a large taper, to a very large step and essentially no taper.

DETAILED DESCRIPTION—FIGURES

The preferred embodiment of this invention is shown in FIGS. 1, 2, 7, 13, 16, 19, and 22. This is a "wood" type club. It utilizes the step diameter change feature with a taper at both ends of the shaft, i.e. in the lower end-of-the-grip area, and also at the club-head-interface. Golf club 1, comprises a shaft 2, head 7 and grip 3. The shaft is substantially tubular and rigid and is made of a composite of structural fiber laminate in the resin matrix. The shaft-comprises a grip portion 7, and medial portion 9, and a head attachment portion 11.

Grip Portion

Referring particularly to FIG. 7 the grip or a first portion 7 has an upper end 201 and a lower grip end 203, and is constructed and configured for mounting of the grip 3. The grip 3 covers the entire exterior surface of the grip portion 7, i.e. from the lower grip end 203 to the upper grip end 201. The grip 3 in FIG. 7 is of conventional design with a constant inner diameter. Accordingly, the diameter of the grip portion 7 is of constant diameter for most of its length, excepting the region of the taper feature 110, described more fully below.

FIG. 9 shows and alternate construction of the grip portion wherein the diameter of the grip portion 7 is tapered from a larger diameter at the grip upper end 201 to a smaller diameter at the lower grip end 203. In this embodiment, the grip 3 is of constant thickness, and overall requires less material. The grip, therefore, has a more uniform feel over its length and the golf club is lighter in this region.

A constant diameter shaft in the grip area, allows the use of a standard grip which is thicker near the butt end of the shaft. This may have some advantageous effect for absorbing the portion of the shock on the upper end of the grip while still providing a good "feel" of the shaft nearer the fingertips. This may be advantageous for example for older golfers, while younger golfers may prefer the thinner constant thickness grip over the entire length of the, grip Medial Portion Referring particularly to FIGS. 1 and 2, the medial portion 9 is visually exposed, and has an upper medial end 207 and a lower medial end 209. The upper medial end 207 and lower medial end 209 are adjacent to the lower grip end 203, and upper head attachment end 211. The diameter of the shaft changes abruptly at the upper and lower medial ends by means of a step 100, i.e., the step diameter change feature, so that the diameter of the shaft at the upper and lower ends of the medial portion are larger than the lower grip end and upper head attachment end, respectively. This allows the attachments for the grip and the head to be dimensioned conventionally, but permits larger than conventional diameters in the medial portion. In this embodiment, at an intermediate region 13 in the medial portion the diameter of the shaft is less than the diameter at the upper and lower medial ends, i.e., the shaft is narrow waisted to localize the bending point to enhance advantageous flexural modes. This acts to better localize the bending of the shaft, with the benefits of controlling the location of the flex point better, and increasing the frequencies and decreasing the deflections associated with the higher vibratory modes, thus reducing potential variabilities in the club head to ball impact.

Figure 3:
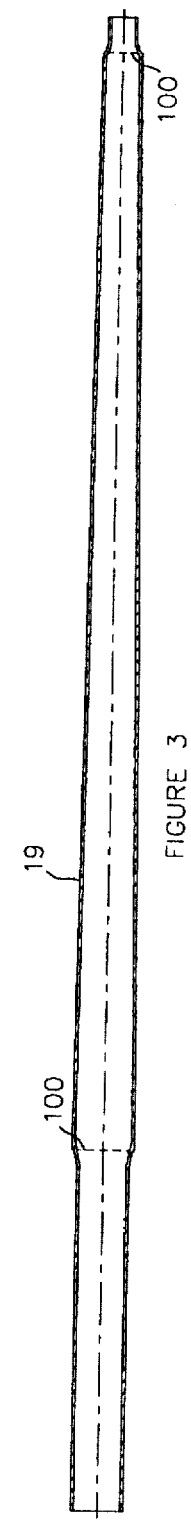
FIG. 3 is a cutaway view of an embodiment of the shaft which has been expanded in the diametral direction to better illustrate the shape features. This shaft uses a continuous laminate through or at the abrupt diameter changes. This shaft diameter profile does not utilize a "narrow waist" or reduced diameter section.

FIG. 3 illustrates a shaft medial portion of alternate construction with no narrow waist, i.e., wherein the shaft diameter in the medial portion tapers from a greater diameter at the upper medial end down to the diameter at the lower medial end.

Head attachment portion

Referring particularly to FIGS. 13, and 16, the head attachment portion comprises an upper head attachment end 211 and a lower head attachment end 215. The major portion of the head attachment portion 11 has an essentially constant diameter over most of its length such that a conventional hosel of a golf club head 5 can be mounted on the head attachment portion.

A taper 115 is also provided at the base step diameter transition feature 100. To fit the hosel over the taper, the inner diameter of a conventional hosel can be reamed out or otherwise shaped to fit the taper. It is also possible to use "spline" features on the smaller diameter "plug" portion of the tip which is inserted into the hosel. The "splines" would consist of 4 to 8 small longitudinal ridges space diametrically around the circumference of the smaller diameter "plug" at the tip of the shaft. These splines act to control the adhesive thickness when the club head is bonded to the shaft. The "splines" (raised longitudinal ridges) would be approximately 0.003" to 0.009" high, roughly 0.060" wide, and semicircular in cross sectional shape. Bonding methods and adhesives can be any suitable known in the art.

The current industry tip diameter for head attachment is 0.335" (as in FIG. 15). Obviously, a non-standard diameter tip could be used, such as a larger than standard diameter tip, e.g., 0.445" diameter.

The step transition, i.e., the step diameter transition feature, 100 is in the exterior surface of the shaft to abruptly change the diameter of shaft to provide a larger than conventional diameter of the shaft at the upper and lower ends 207, 209 of the medial portion. The change accomplished by the step is at least 0.02 diameter, preferably between 0.02 and 0.2 inches. Preferably, the step size is at least 0.02 inches to achieve a change in diameter of 0.04 inches.

Figure 18:
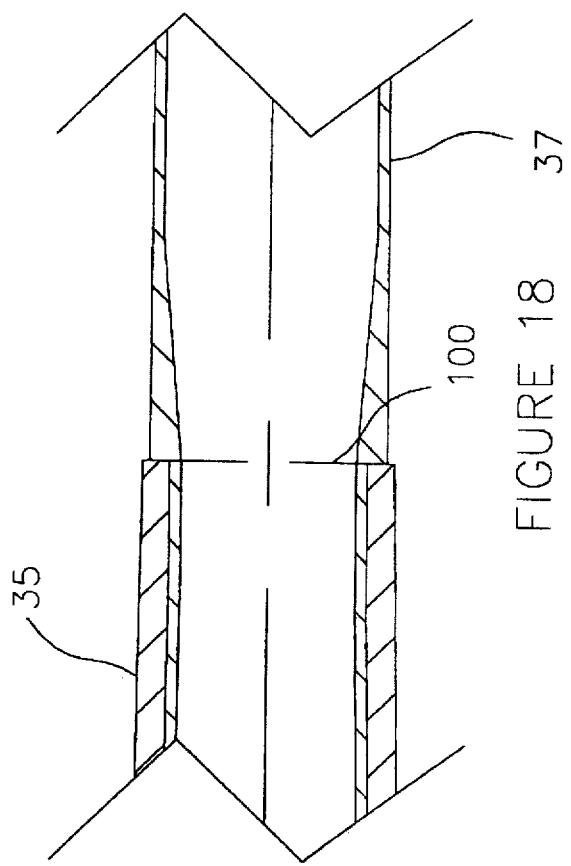
FIG. 18 illustrates an expanded view of the junction between the lower end of the grip and the golf club shaft for one embodiment of this invention. This embodiment of the invention utilizes a large discontinuous step in the outside diameter at the lower end of the grip, without any tapered conical section of the shaft exterior.
Figure 19:
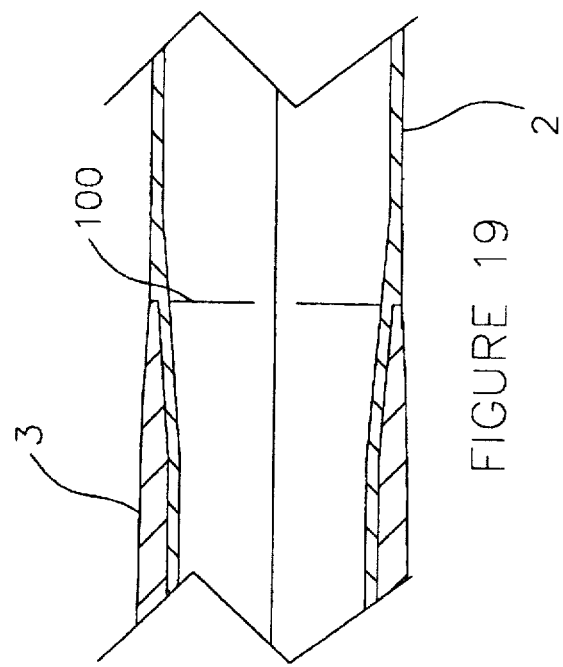
FIG. 19 illustrates an expanded view of the junction between the lower end of the grip and the shaft on the preferred embodiment of this invention. This embodiment uses a smaller discontinuous step, preferably 0.015" to 0.045, with the tapered conical section accomplishing relatively more of the diameter change.

In a preferred embodiment of the invention, the diameter change is only partially accomplished the step transition feature. Preferably the step transition feature is also combined with a conical taper at the base of the step. For example at step where the adjacent lower grip end and upper medial end join, the step transition reduces the diameter from the diameter at the upper medial end to a lesser diameter, and a taper extending toward the upper grip end reduces the shaft diameter to the diameter of the grip portion. Likewise, the same can be done at the juncture of the lower medial end the upper head attachment end. The taper assists in reducing the structural discontinuity and thus the stress at that step diameter transition. This combined step-taper change feature as applied to grips is illustrated in 19, which compares with the step change feature without a taper in FIG. 18. In FIG. 18, the lower end of the grip portion 37 (which is covered by grip 35) joins the medial portion at a step 100. In FIG. 19, the lower end of the grip portion of the shaft 2 (which is covered by grip 3) joins the medial portion at an annular step 100. At the base, of the step 100, at the lower end 7 of the grip portion 7 is an annular conical taper that reduces the external diameter of the shaft from that at the base of the step to the diameter of the grip portion. The taper allows a greater transition of the diameter, and in combination with the step allows a grip of conventional diameter and thickness to be flush with the out surface of the medial section. The visual appearance is a continuous unbroken outer surface from the grip to and into the medial section. Without the taper, as shown in FIG. 18, either the step is undesirable large or the grip outer diameter is slightly larger than the diameter at the upper end of the medial section.

A taper is applied at the head attachment portion as described above for FIG. 13. Use of the step diameter change feature on the shaft tip, particularly when used in combination with the taper, produces a smooth stepless exterior surface at the transition between the club head and the shaft. It may also be possible to use this shaft with standard club heads, that is club heads manufactured for use with traditional shafts having a constant 0.335" outer diameter at the tip. A special drill bit or reaming tool would be used with a hand drill to add the taper feature to the inside of the hosel on the standard club heads, prior to adhesively bonding the shaft tip to the club head. This would have the obvious advantage of making a wide range of club heads available for use with the new shafts.

In the embodiment of the invention illustrated in FIG. 18 a step diameter change feature is used at the lower-end-of-the-grip, on the shaft. This embodiment of the invention uses an outer shaft diameter just below the lower end of the grip that is slightly smaller than the grip outer diameter, producing a visual step at the transition. It would, of course, be just as easy to make the two diameters equal at the transition, to produce a smooth stepless exterior surface at the transition, as in FIG. 19. In general, the shaft diameters have been chosen in the clubs illustrated in the figures of this invention, to leave a small step between the lower end of the grip and the shaft. This has been done in part to illustrate the versatility of the design concept. But, as mention, it can be seen that a shaft of the invention can be designed with no visual step discontinuity between the outer surface of the grip and surface on the medial section. Regardless, the step size between the shaft and grip is smaller in all the embodiments of this invention, than in traditional composite shafted club (shown in FIGS. 11, 15, 21, 26), and in an existing commercially available oversized shafted club (shown in FIGS. 12, 20).

The shaft of FIGS. 12 and 20 uses a gradual taper to change diameters to achieve an oversized portion on the upper end of the shaft below the grip. This shaft is marketed with the descriptor of a "bubble shaft". The diameter transition just below the grip could be considered unappealing cosmetically. The marketing approach used for the shaft calls the shaft a "bubble shaft", which calls attention to the diameter transition. This marketing approach could be viewed as an attempt to circumvent the generally negative appearance of the "bubble", by calling attention to it, and claiming it has a beneficial effect on the performance. The shaft made by this invention eliminate the unsightly "bubble" and produce a much cleaner visually appealing shaft, which also performs better because a larger portion of the shaft can be made with larger diameters.

In actual practice a practitioner may use some or all of the design features of this invention to increase its performance relative to traditional composite shafts. For example the step diameter change feature may no be applied to both ends, e.g., used only on the grip end and not the tip end. For example, the step diameter change feature can be used only at the grip end and eliminated at the shaft-tip to hosel junction.

A preferred embodiment of this invention utilizes the step diameter change feature at both ends of the shaft, i.e. in the lower end-of-the-grip area, and also at the club-head-interface. The larger than normal shaft diameters increase the structural efficiency and reduce shaft weight. The shaft diameter is larger than normal and tapered under the grip to allow use of a thinner constant thickness grip which reduces grip and shaft weight. This preferred shaft also utilizes a "narrow waist feature", that acts to localize the bending of the shaft increasing control of the impact.

Figure 23:
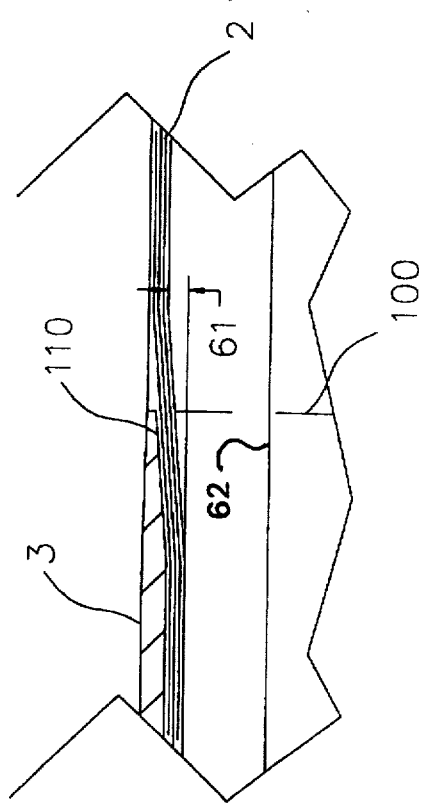
FIG. 23 illustrates a greatly expanded crossectional view of the junction between the lower end of the grip and the golf club shaft for an embodiment of this invention. This embodiment utilizes a slightly larger step size than that of the preferred embodiment of this invention.
Figure 24:
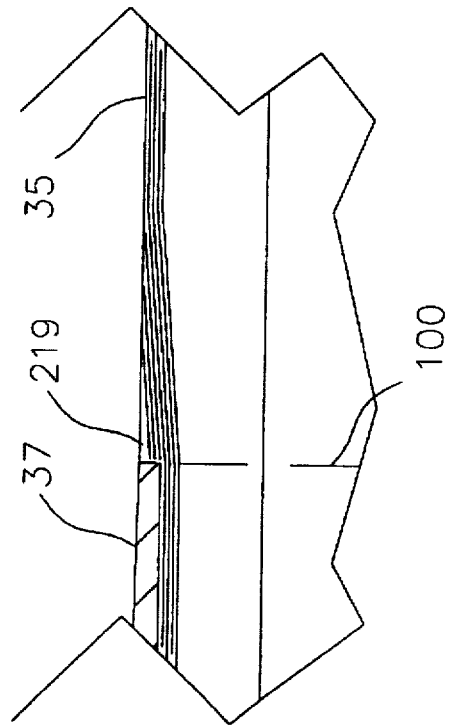
FIG. 24 illustrates a greatly expanded view between the lower end of the grip and the shaft on one embodiment of this invention. This embodiment of the invention uses a large discontinuous step at the lower end of the grip.

As previously discussed the preferred shafts of the invention are molded with laminate layers being continuous at the step diameter change. Referring to FIGS. 22, 23 and 24, laminate layers 217 are continuos through the step transition. In FIG. 22, a conical taper diameter change 110 is also provided. The structural laminate layers 217 and the taper are at the same angle 61 with respect to the center axis of the shaft, i.e., between about 5 and 35 degrees, preferably 10 degrees. In FIG. 23, is shown a similar embodiment with a smaller conical taper 110 with a large step size for the abrupt step. In FIG. 24, there is no conical taper for transition of the diameter of the outer surface, but the entire transition is accomplished by means of the abrupt step 100. In all three embodiments, FIGS. 22 to 24, the laminate maintains a sufficiently small angle for strength, yet an abrupt step is provided. Where the step is large, filler material, e.g. non-structural laminate fiber 219, may optionally be used in building up the abrupt step, as shown in FIG. 24. In addition, a non-structural laminate, e.g. a woven cloth, may be used at the outer surface medial portion provide appearance and texture to the bare surface. This laminate would end at the step 100.

Figure 4:
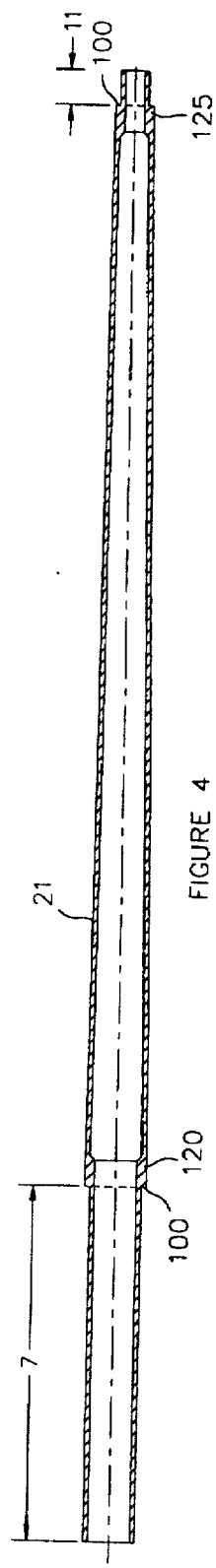
FIG. 4 is a cutaway view of an embodiment of the shaft which has been expanded in the diametral direction to better illustrate the shape features. This shaft uses a laminate for the medial portion that ends at the abrupt diameter change of the step, with continuous laminate of the grip and head attachment portions extending under the laminate of the medial portion. This shaft diameter profile does not utilize a "narrow waist" or reduced diameter section.
Figure 26:
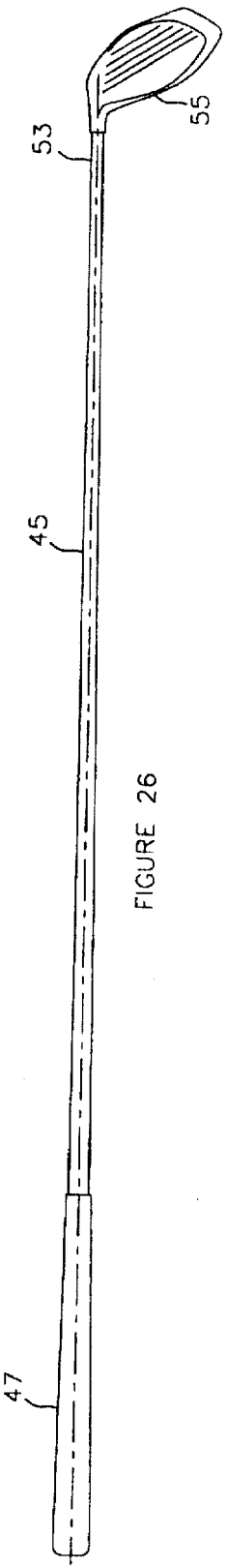
FIG. 26 is an exterior view of a complete traditional golf club.
Figure 25:
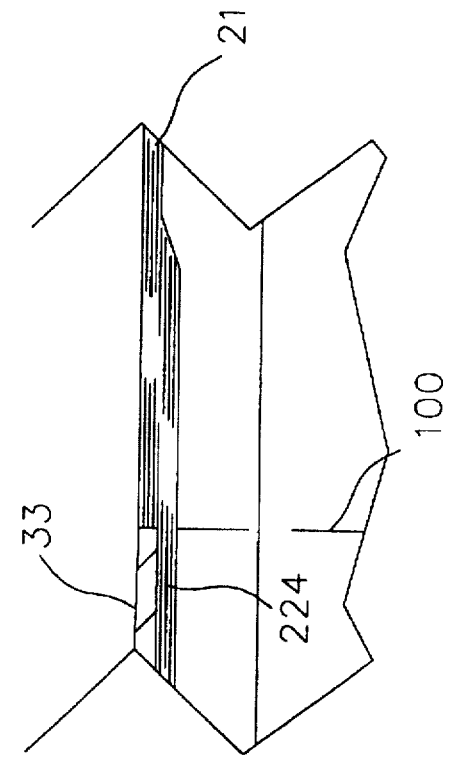
FIG. 25 illustrates a greatly expanded view of the junction between the lower end of the grip and the shaft on embodiment of this invention. This embodiment of the invention uses a discontinuous laminate in the medial section that ends at the abrupt step transition.

An alternate embodiment to molded shafts are shafts that utilize boned joints between separate composite tubular components to form a bonded shaft. The three components would be manufactured via traditional means using rigid internal mandrels, and then secondarily bonded together. This could also be accomplished as a co-cured operation. In this embodiment the structural laminate fibers of the large diameter medial portion are discontinuous, end at the abrupt step transition. Fibers from the grip portion and/or head attachment portion underlie the structural laminate of the medial portion and are continuous at the step transition. This embodiment is illustrated in FIGS. 4, 8, 14 and 25. In the shaft of the invention 21, the step diameter change feature 100 is at the juncture of the grip portion and the medial portion 120 and at the juncture of the medial portion 120 and the head attachment portion 125 (FIG. 4). The grip 33, as illustrated in FIG. 8, has a constant inner diameter with the varying thickness to provide a conventional outer grip surface that is tapered. The laminate fibers are shown in FIG. 25 for the diameter change at the grip. Discontinuous laminate 221 of the medial section ends at the abrupt step diameter change 100. Laminate layers 223 from the grip portion 224 are continuous at the diameter change 100 and underlie laminate of the medial portion 225, and end at some point under the medial portion 225.

At the head attachment portion, (FIG. 14) the shaft has discontinuous laminate of the medial section that ends at the abrupt step diameter change. Likewise, laminate layers from the head attachment portion are continuous at the diameter change and underlie laminate of the head attachment portion, and end at some point under the medial section.

Figure 10A:
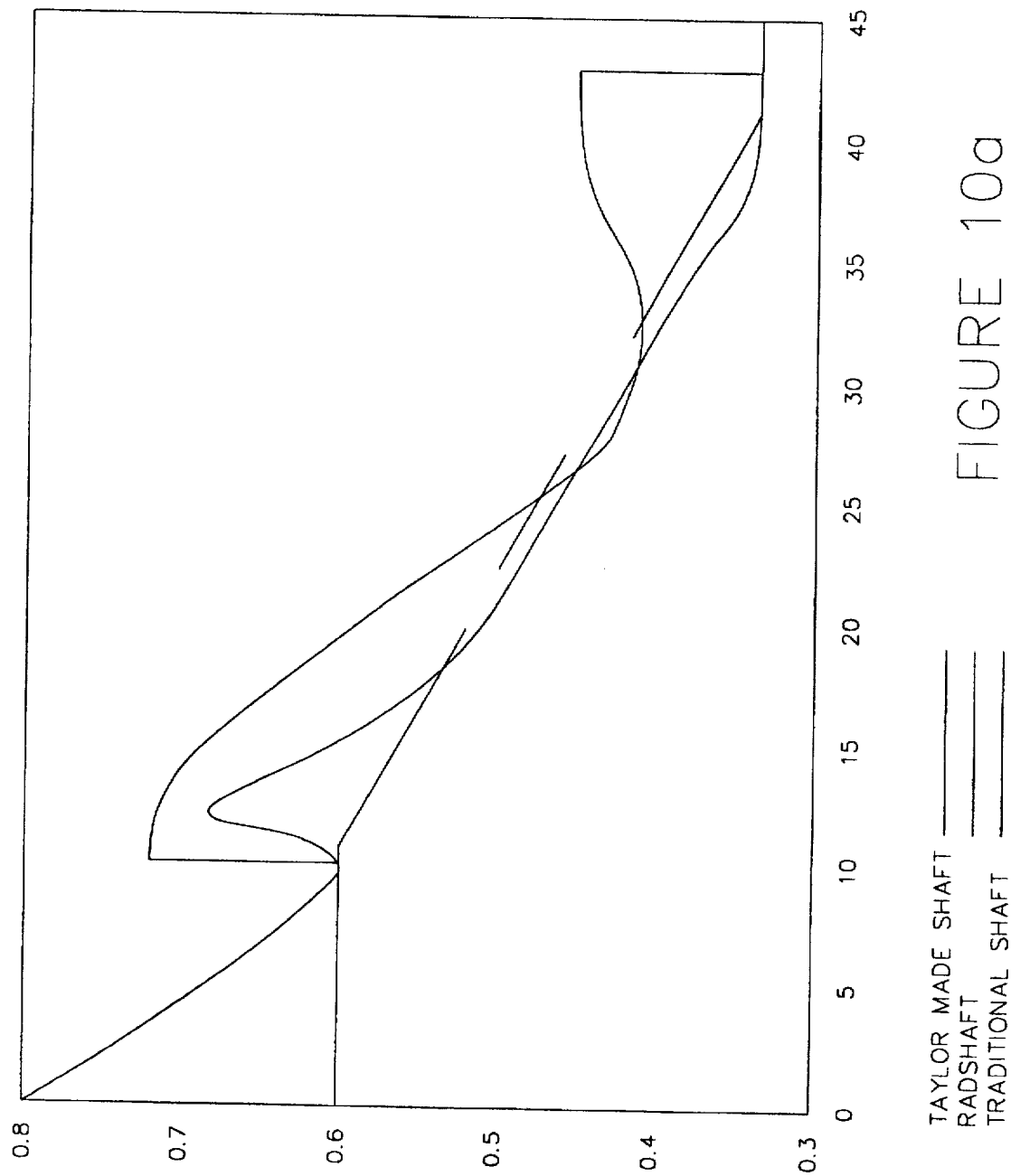

FIGS. 10a and 10b are graphs showing shaft length on the x axis vs. shaft diameter on the y-axis. The solid line represent shafts of the invention, the dashed line represents a traditional shaft, and the dotted line represents the "bubble" shaft discussed above. On both graphs the traditional shaft is shown as having a grip portion of about 0.6 inches that is constant. The medial portion tapers smoothly to about 0.33 inches and the head attachment portion maintains that diameter.

The bubble shaft is shown as having a grip portion that tapers down to about 0.6 inches and then tapers out in the medial portion at a slightly larger rate to a larger diameter to form the bubble. The medial portion then tapers to the diameter of the head attachment section. Note that without any abrupt diameter change, there is not the advantage of a larger shaft diameter in the medial portion adjacent to the grip portion or the head attachment portion. Typically in the art, large discontinuities in composite materials are avoided to maintain their strength. Thus, in the bubble shaft the transition in the bubble shaft to a large diameter is by means of a relatively gradual taper.

The shaft of the invention is clearly shown with an abrupt diameter change that increases the diameter of the medial section to a diameter greater than is practical with the bubble shaft. FIG. 10a shows a narrow waisted shaft, and 10b a shaft that maintains a large shaft diameter the entire length of the medial section. Thus, it can be seen by practice of the invention, is possible to obtain large diameters in the medial portion while maintaining the same dimensions of the grip portion and the head attachment portion as in traditional shafts. The abrupt change can be achieved, and the strength of the composite maintaining, since the structural laminate fibers do not follow the abrupt change in the external surface. If the structural laminates are continuous, the only known method for forming a abrupt step is by molding the shaft which provides an external surface of precise dimensions. Such precise external dimensions are not possible in shafts formed by wrapping a hard mandrel. By molding the external surface, the structural laminate layers can be maintained at a sufficiently shallow angle that the strength of the shall at the transition is not detrimentally compromised. Without molding, the only method of providing the step is my boning preforms as described above, with the structural laminates of the medial section ending at the step.

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention.

What is claimed is:

1. A substantially tubular rigid golf club shaft made of a composite of structural fiber laminate in a resin matrix, the shaft comprising;

a step transition in the exterior surface of the shaft that abruptly changes the diameter of the shaft from a first portion of the shaft to an immediately adjoining second portion of the shaft by at least 0.02 inches in the diameter of the shaft, essentially all of the structural laminate being continuous at the step transition and the angle of the laminate in the continuous structural laminate in relation to a longitudinal axis of the shaft being less than 35 degrees.

2. The shaft of claim 1 wherein the change in diameter at the transition is between 0.04 and 0.2 inches.

3. The shaft of claim 1 wherein the step transition includes non-structural laminates.

4. The shaft of claim 1 wherein the first portion includes a conical taper that extends from a larger diameter at the base of the step transition to a reduced diameter.

5. The shaft of claim 1 wherein the first portion has a smaller diameter than the second portion at the step transition.

6. The shaft of claim 5 wherein the first portion is a grip portion, and second portion is a medial portion, the grip portion having a upper grip end and a lower grip end and being constructed and configured for a grip to be mounted on said grip portion that covers the exterior surface of the grip portion and extends substantially the entire length of said grip portion from said upper grip end to said lower grip end, the medial portion having a upper medial end adjacent to the lower grip end and extending to a lower medial end, the step transition being at the location on the shaft where the upper medial end and lower grip end are adjacent.

7. The shaft of claim 6 wherein the grip portion is tapered with respect to a longitudinal axis with a smaller diameter near the step transition to a larger diameter at the upper grip end.

8. The shaft of claim 7 wherein the grip portion is constructed and configured to support a grip of constant thickness mounted on the grip portion.

9. The shaft of claim 6 wherein the step transition is sized to provide a visually continuous surface between the grip overlying the grip portion and the medial portion.

10. The shaft of claim 5 wherein the first portion is a head attachment portion, and second portion is a medial portion, the medial portion having an upper medial end extending to a lower medial end adjacent to the head attachment portion, the head attachment portion having an upper head attachment end and a lower head attachment end with the upper head attachment end adjacent to the lower medial end, the head attachment portion constructed and configured for a golf club head hosel to be mounted on said head attachment portion such that the hosel covers the exterior surface of said head attachment portion and extends substantially the entire length of said head attachment portion from said lower head attachment end to said upper head attachment end, the step transition being at the location on the shaft where the lower medial end and upper head attachment end are adjacent.

11. The shaft of claim 1 additionally comprising structural laminate in the second portion that ends abruptly at the step transition.

12. The shaft of claim 1 wherein the first portion is essentially of constant diameter for its entire length.

* * * * *